United States Patent
Tolosa

[15] 3,649,345
[45] Mar. 14, 1972

[54] METHOD OF COATING DENTURES TO PROVIDE A POLISHED SURFACE

[72] Inventor: Roberto Tolosa, 1318 East 4th Ave., Hialeah, Fla. 33010

[22] Filed: Apr. 1, 1969

[21] Appl. No.: 812,295

[52] U.S. Cl. .................... 117/138.8UA, 117/64 R, 117/113, 117/119.6, 117/161 UB, 32/2
[51] Int. Cl. .................... A61c 13/00, B44d 1/06, B44d 5/00
[58] Field of Search ............... 117/2 R, 138.8 UA, 161 UB, 117/113; 32/2

[56] References Cited

UNITED STATES PATENTS

| | | | |
|---|---|---|---|
| 2,622,991 | 12/1952 | Sturm | 117/138.8 UA |
| 2,912,759 | 11/1959 | Schlesinger | 117/138.8 UA |
| 3,084,068 | 4/1963 | Munn | 117/161 UF |
| 3,485,662 | 12/1969 | Metevia | 117/2 |

*Primary Examiner*—William D. Martin
*Assistant Examiner*—Ralph Husack
*Attorney*—Markva, Smith & Kruger

[57] ABSTRACT

A method of treating the surfaces of preformed artificial prostheses, such as dentures, to produce thereon a finish coating and polish of pleasing appearance and improved smoothness and fit, which involves maintaining for a limited time contact between the surfaces and a heated liquid comprising a monomer of methyl methacrylate and, if desired, certain other additives.

9 Claims, No Drawings

METHOD OF COATING DENTURES TO PROVIDE A POLISHED SURFACE

BACKGROUND OF THE INVENTION

Artificial dentures have heretofore been formed on metal frameworks from polymerized substances such as methyl methacrylate. Dentures which incorporate these plastics have been found to have the advantage of chemical stability as well as good mechanical strength.

The basic dentures generally are prepared by mixing polymers of, for example, polymethyl methacrylates to form a paste with monomeric methyl methacrylates, and by hardening this paste in a mold under pressure and heat with the addition of polymerizing catalysts. The dentures so formed possess the basic structure but tended to be rough and generally unsatisfactory as a finished denture.

In order to improve the dentures, processes were developed in which the basic denture was provided with a swelled lining of soft material having good physiological properties and chemical stability as well as mechanical strength. In order to provide these soft lining surfaces, mixtures of monomeric liquid polymerizable methacrylic acid and the polymerization products prepare therefrom as, for example, polymeric acid derivatives of monomeric methyl methacrylic acid, together with suitable catalysts, such as organic peroxides, are packed in conventional dental molds and therein hardened under pressure and heat. Such lining may be of appropriate softness and resilience to avoid the irritation attendant upon contact of the hard parts of the dentures with the mouth tissues and to provide improvement in the fit of the dentures with the mouth tissues. The lining material for this purpose is quite effective, but it is clear that the process is quite complex, involving multiple steps and the handling of different dimensions so that the final lined product will have the proper fit.

The application of suitable linings may also be accomplished by a mechanical process involving removal of an appreciable portion of the surface and replacement thereof by a plastic coating. Such coating may be formed by polymerization of a prepared polymerizable material, the polymerization of which is aided by the use of heat and the presence of a catalyst or activizer. The difficulty in this process is involved in the maintaining of the critical fit dimensions which are necessary if dentures are to hold their position and provide comfort.

In the standard commercial process, it has been customary to prepare the denture from a combination of metallic and plastic substances, the denture being formed in a mold under heat and pressure and polymerized to harden the final shape. The molds are made from the patient so as to achieve the desired close fit. The denture thus formed is accurate, but somewhat rough and unpolished. Accordingly, it has been the prior practice for a skilled technician using brushes, pumice stones and felts and polishing substances to put the final polish or shine on the denture. This required a high skilled technician so that the polishing and smoothing was accomplished without the removal of critical dimensional material. This polishing process required at least 10 to 15 minutes. Even then, the result has not been as good as desired, and this was particularly true in prostheses having a deep or roof palate.

There has been a substantial need in the field for a simple, practical and better method of providing the final shine and polish to the basic cast denture, without complex multiple dimension steps and without changing the critical fit and shape dimensions of the denture.

OBJECTS OF THE INVENTION

It is an object of the invention, therefore, to provide a process for producing on a plastic denture or dentures, in a matter of seconds, a final surface coating of the desired smoothness and polish, which is of better quality than that heretofore obtained with brushes, pumice stones and felts by a skilled technician working by hand for a period of 10 to 15 minutes.

Still another object of the invention is to produce by a relatively simple commercial process a smooth and polished denture having a close fit, the addition or removal of critical dimensional material being avoided.

Still another object of the invention is to provide a process wherein an even better polish and finish may be provided on a basic denture involving a time factor of only a few seconds as compared with the 10 to 15 minute polishing time previously required.

Another object of the invention is to provide a process which is flexible enough to permit the polishing and finishing of one isolated denture, or of a plurality of dentures simultaneously, thereby substantially expediting the processing of a quantity of dentures and substantially reducing the time and skilled manpower required for processing a number of dentures.

DESCRIPTION OF THE PREFERRED EMBODIMENT

In carrying out the present invention, the following procedure is used:

a. A preformed but unpolished denture (or dentures) is completely submerged in a boiling solution of the polishing liquid over a flameless heat source. This liquid may vary in composition, but it is essentially liquid methyl methacrylate (monomer) to which there may be added a pigment to create the proper color for prostheses, or a pine oil to provide fragrance and additional smoothness.

b. The dentures are held in the actively boiling solution for a period in the range of 10 to 15 seconds.

c. The container is removed from the heat source, and the dentures are soaked in the hot liquid for a period in the range of 20 to 30 seconds.

d. The dentures are quickly removed from the liquid, placed on a clean glass plate and dried, preferably in a current of warm, dry air.

The average time and the preferred time for the combination of boiling and soaking steps is therefore in the range of 30 to 45 seconds. The total time should never exceed 60 seconds. During the period of ebullition, the vessel should be substantially but not completely covered so as to reduce the loss of liquid by evaporation without expansion explosion. Since the methyl methacrylate is a volatizable liquid which gives off inflammable vapors, the container must be protected from flame or hot elements capable of causing ignition.

In the treatment disclosed, the denture as removed from the mold is subjected to polishing and cleaning action, without destroying the desired close fit, and is sealed against the admission of food particles and other minor foreign bodies and substances. The tooth structure particularly is provided with a lining which is resilient and which relieves tenderness at pressure points on the gum tissues, while providing improved adhesion to the tissues.

At the conclusion of the soaking period, the dentures are normally lifted out with nippers, placed on a clean sheet of vitreous material, such as a glass sheet, and are exposed to a gentle, warm, drying current of air.

The following examples indicate how the process can be carried out in practice.

EXAMPLE I

A liquid monomer of methyl methacrylate (100 percent) is placed in a clean container, substantially covered but not completely sealed, and the liquid is quickly brought to a boil on a flameless heat source. At ebullition, the dentures are immediately completely submerged in the liquid and boiled for 10 to 15 seconds. The container is then removed from the heat source, and the dentures are permitted to remain submerged in the hot liquid for a period of 20 to 30 seconds. The dentures are then quickly removed, placed on a clean glass plate, and exposed to a current of warm air until dry.

EXAMPLE II

The same procedure of Example I is carried out, but the liquid used in a composition of the following proportions:
Methyl methacrylate monomer 1,000 c.c.
Sudan III (pigment) — 1 drop of a 1 percent solution
Pine Oil — 5 c.c.

EXAMPLE III

The method is carried out exactly as in Example I except that the liquid has the following proportions:
Methyl methacrylate monomer — 60%
Methyl methacrylate (cross linked) — 40%

Since in the process of the present invention, a number of dentures may be treated simultaneously, the total time for carrying out the cleaning and polishing process of the basic molded denture is considerably reduced in contrast to that provided by the prior art wherein only one denture at a time could be cleaned and polished by hand, each denture requiring 10 to 15 minutes time of a skilled technician.

It will be evident that the process of the present invention can be used for a dental prosthesis having any combination of metal or other structural elements, as long as a substantial body portion of the prosthesis is formed of a polymerized methyl methacrylate, the said substantial body portion forming the gum simulating area of the denture or the parts of the denture which normally engage the natural gum tissues of the mouth of the wearer of the denture.

What is claimed is:

1. The method of surface treating a preformed denture structure having a substantial body portion formed of polymerized methyl methacrylate, comprising the steps of:
   a. immersing said denture structure for a period of up to 60 seconds in a bath comprising at least 60 percent liquid methyl methacrylate monomer brought to ebullition, and
   b. thereafter quickly removing said denture from said bath and drying said denture.

2. The method of claim 1 wherein the said immersing time of step (a) is in a range of from 30 to 45 seconds.

3. The method of claim 1 wherein the drying of step (b) is achieved by placing said denture structure in a gentle current of warm, dry air.

4. The method of claim 1 wherein
   said immersing step comprises immersing said denture structure in the liquid in ebullition over a heat source for a period of 10 to 15 seconds, and
   holding said denture structure in the liquid removed from said heat source for a period in the range of 20 to 30 seconds.

5. The method of claim 1 wherein said bath further includes a minor portion of coloring matter.

6. The method of claim 1 wherein said bath further includes a minor portion of pine oil.

7. The method of claim 1 wherein said bath further includes a substantial portion of cross linked methyl methacrylate.

8. The method of claim 7 wherein said methyl methacrylate monomer and said cross linked methyl methacrylate are in the proportion of 60 percent and 40 percent, respectively.

9. The method of claim 1 wherein said bath comprises a combination of the following proportions:
   a. methyl methacrylate monomer—1,000 c.c.
   b. Sudan III (pigment)—1 drop of a 1 percent solution
   c. Pine Oil—5 c.c.

* * * * *